United States Patent
Du et al.

(10) Patent No.: US 11,731,457 B1
(45) Date of Patent: Aug. 22, 2023

(54) SPLIT-TYPE HARD FRONT AXLE AND VEHICLE HAVING SAME

(71) Applicant: Shanghai Linghuo Trading Co., LTD., Shanghai (CN)

(72) Inventors: Dehui Du, Shanghai (CN); Jia Fu, Shanghai (CN)

(73) Assignee: SHANGHAI LINGHUO TRADING CO., LTD., Shanghai (CN)

( * ) Notice: Subject to any disclaimer, the term of this patent is extended or adjusted under 35 U.S.C. 154(b) by 0 days.

(21) Appl. No.: 18/099,241

(22) Filed: Jan. 19, 2023

(51) Int. Cl.
*B60B 35/14* (2006.01)

(52) U.S. Cl.
CPC ........ *B60B 35/14* (2013.01); *B60B 2310/305* (2013.01); *B60B 2900/116* (2013.01)

(58) Field of Classification Search
CPC ....... B60B 35/122; B60B 35/16; B60B 35/14; B62D 7/18
See application file for complete search history.

(56) References Cited

U.S. PATENT DOCUMENTS

| | | | | |
|---|---|---|---|---|
| 3,549,166 | A * | 12/1970 | Moore | B60G 7/005 384/396 |
| 4,635,952 | A * | 1/1987 | Smith | B62D 7/18 280/93.512 |
| 5,340,137 | A * | 8/1994 | Carraro | F16C 11/02 180/254 |
| 5,628,578 | A | 5/1997 | McClanahan et al. | |
| 7,377,598 | B2 * | 5/2008 | Doud | B60B 35/003 180/378 |
| 7,976,036 | B2 * | 7/2011 | Reid | B62D 7/18 301/124.1 |
| 11,203,231 | B1 * | 12/2021 | Du | F16B 7/0406 |
| 11,214,094 | B1 * | 1/2022 | Du | F16B 7/182 |
| 2014/0356062 | A1 | 12/2014 | Janvier et al. | |
| 2018/0066720 | A1 * | 3/2018 | Dilworth | F16D 65/0062 |

FOREIGN PATENT DOCUMENTS

| | | |
|---|---|---|
| CN | 203902159 U | 10/2014 |
| KR | 10-1342666 B1 | 12/2013 |

* cited by examiner

*Primary Examiner* — Scott A Browne
(74) *Attorney, Agent, or Firm* — Cheng-Ju Chiang

(57) ABSTRACT

A split-type hard front axle includes an axle housing; an axle tube connected to the axle housing; an inner-C-forging connected to the axle tube and configured for connecting with a kingpin knuckle; and a connection structure cooperated with the inner-C-forgoing for detachably fixing the inner-C-forging on the axle tube. The axle tube includes a first angle adjustment structure. The inner-C-forging includes a second angle adjustment structure. A portion of the inner-C-forging is capable of deforming under a force exerted by the connection structure, to fix the inner-C-forging on the axle tube. The first angle adjustment structure is capable of cooperating with different portions of the second angle adjustment structure to make the inner-C-forging have different installation angles on the axle tube, and a caster to pinion angle is being different at inner-C-forging's different installation angles. A vehicle is also provided.

20 Claims, 7 Drawing Sheets

SPLIT-TYPE HARD FRONT AXLE AND VEHICLE HAVING SAME

CROSS REFERENCE TO RELATED APPLICATION

The present patent document claims the benefit of priority of Chinese patent application number 202220245524.7, filed on Jan. 30, 2022, and entitled "SPLIT-TYPE HARD FRONT AXLE AND VEHICLE HAVING SAME". The entire disclosure of the above-identified application is incorporated herein by reference.

TECHNICAL FIELD

The present document relates to automobile structures, in particular to a split-type hard front axle and a vehicle having the same.

BACKGROUND

Since the launch of the first off-road vehicle model, the appearance, interior trim, four-wheel drive technology, and power system of the off-road vehicle have made great progress, however, as the core of the chassis, the integral front axle assembly has not been substantially improved.

SUMMARY

The present document discloses, among other things, a split-type hard front axle and a vehicle having the same. The split-type hard front axle can conveniently adjust the caster angle and the pinion to driveshaft angle independently while ensuring the support strength.

The split-type hard front axle includes an axle housing, an axle tube connected to an end of the axle housing, an inner-C-forging located at an end of the axle tube away from the axle housing and configured for connecting with a kingpin knuckle, and a connection structure configured for detachably fixing the inner-C-forging on the axle tube. The axle tube is provided with a first angle adjustment structure formed on an outer wall thereof. The inner-C-forging is provided with a connection ring. The connection ring is provided with a second angle adjustment structure and a slot. The inner-C-forging is sleeved on the outer wall of the axle tube through the connecting ring, with the first angle adjustment structure cooperating with the second angle adjustment structure. The slot is capable of being compressed under a force of the connection structure, to fix the inner-C-forging on the axle tube. The first angle adjustment structure and the second angle adjustment structure have different cooperation positions so that the inner-C-forging has different installation angles on the axle tube, and a caster to pinion angle is different at inner-C-forging's different installation angles.

In some embodiments, the split-type hard front axle includes two axle tubes and two inner-C-forgings, the two inner-C-forgings are detachably arranged on the two axle tubes through the connection structures respectively.

In some embodiments, one of the first angle adjustment structure and the second angle adjustment structure is provided with a plurality of protrusions, the other one of the first angle adjustment structure and the second angle adjustment structure is provided with a plurality of depressions, the protrusions or the depressions are disposed along a circumferential direction of a corresponding axle tube or a circumferential direction of the connecting ring, the second angle adjustment structure has different cooperation positions on the first angle adjustment structure by means of the cooperation of different protrusions and different depressions.

In some embodiments, both of the first angle adjustment structure and the second angle adjustment structure are provided with a plurality of gear teeth arranged at intervals along respective circumferential directions, the protrusions are the gear teeth, and the depressions are formed between adjacent gear teeth.

In some embodiments, the connecting ring is provided with two connecting ears on both sides of the slot, and the connection structure includes a first bolt and a first nut, the first bolt passes through the two connecting ears and connects with the first nut.

In some embodiments, a diameter of the first angle adjustment structure is greater than a diameter of the axle tube.

In some embodiments, the first angle adjustment structure is provided with a groove, the groove is recessed inwardly from an outer wall of the axle tube and extends along a circumferential direction of the axle tube, and a side wall of the connecting ring is provided with a through hole, the connection structure further includes a second bolt, and the second bolt passes through the through hole on the connecting ring and extends into the groove.

In some embodiments, both axial sides of the groove are provided with the protrusions or the depressions.

In some embodiments, when the second bolt extends into the groove, an extension direction of an axis of the second bolt is tangent to an outer circumference of the axle tube.

In some embodiments, the inner-C-forging is provided with two opposite connecting holes for fixing the kingpin knuckle, the two connecting holes are respectively arranged at opposite sides of an axis of the axle tube.

The present document also discloses a vehicle, which includes the above split-type hard front axle.

In some embodiments, the inner-C-forging on at least one of the axle tubes is separately arranged from the corresponding axle tube, and the inner-C-forging is detachably sleeved on the outer wall of the axle tube. When it is necessary to adjust the caster angle, the components on one side of the vehicle can be disassembled, and then the connection structure is loosened, and the inner-C-forging is rotated around its own axis to a suitable angle, so that the protrusions engage with the corresponding depressions. This can change the installation angle of the inner-C-forging relative to the axle tube, and change the angle of the installation point, and further can adjust the caster angle. After the adjustment is completed, the slot on the connecting ring is relocked through the connection structure, so that the inner-C-forging is fixed on the connecting ring. Through the above method, the installation angle of the inner-C-forging relative to the axle tube can be changed, and the angle of the installation point can be changed, and the caster angle can be adjusted as well. Therefore, under the premise of ensuring the support strength, the split-type hard front axle can easily adjust the caster angle and the caster to kingpin angle on both sides of the vehicle independently. Meanwhile, the positions and angles of the installation points of the components on the axle tube are still kept as original, and variables that affect the chassis wheelbase, the directional accuracy, and the suspension height can not be introduced.

DETAILED DESCRIPTION OF PREFERRED EMBODIMENTS

Figure 1:
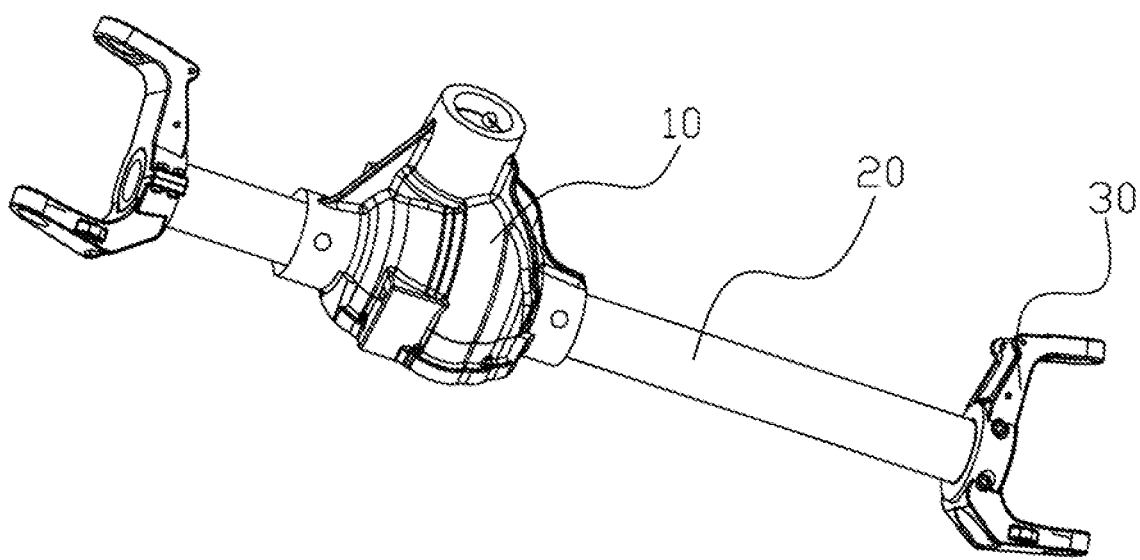
FIG. 1 is a schematic view of an example of a split-type hard front axle.

In order to make the purpose, the technical solutions and the advantages of the present document, various embodiments will be further described in detail.

It should be noted that, in the description, terms such as "first" and "second" are used to distinguish similar objects, and are not necessarily used to describe a specific order or sequence. It is to be understood that the data so used are interchangeable under appropriate circumstances such that the embodiments described herein can be practiced in sequences other than those illustrated or described herein.

In the present document, the orientation or positional relationship indicated by the terms "upper", "lower", "top", "bottom", etc. are based on the orientation or positional relationship shown in the drawings, and are only for the convenience of describing and for simplifying the description, rather than indicating or implying that the device or element must have a specific orientation, be constructed and operate in a specific orientation, and thus should not be construed as limitation of the embodiment. The X direction refers to the length direction of a vehicle, the Y direction refers to the width direction of the vehicle, and the Z direction refers to the height direction of the vehicle.

In addition, unless be clearly specified and limited, terms such as "install", "connect", "link" and "fix" in the present document should be interpreted in a broad sense. For example, the term may be used to describe a fixed connection or a detachable connection, or an integration into a single piece; directly connected, or indirectly connected through an intermediary, and may be an internal communication between two elements or an interaction relationship between two elements, unless otherwise clearly defined. For those of ordinary skill in the art the specific meanings of the above terms in the present document can be understood according to specific situations.

BRIEF INTRODUCTION

In the past 25 years, the global sales of off-road vehicles have exceeded 30 million, and consumers' demand for customization and modification of such models is also increasing day by day. For global automakers and modification shops, changing to the bigger tires, replacing or enhancing the suspension system to lift the vehicle chassis for more ground clearance, and making the overall appearance of the vehicle more attractive have become the most common ways of customization in the industry. However, the lift of the vehicle chassis also brings the following pain points (technical limitations) that obviously affect the vehicle handling experience, moreover, seriously threaten the safety of the people in the vehicle.

The first pain point is related to the transmission system: the driveshaft or transfer case is abnormally worn, accelerate damage, and has obvious chassis resonance, and the transmission torque cannot be fully released, which affects the power output.

The second pain point is related to the return-to-center capability: the extremely poor handling feeling, the front wheel shimmy, the wobbly direction, the weakened wheel return-to-center capability after coming out of a turn, and the requirement of constant correction of direction above medium speed.

The third pain point is related to the cruise driving capability: the increase of tire diameter, the uneven wear, the factory deviation of individual product, the left-right imbalance of the suspension system, and other factors introduced after the lift the vehicle chassis jointly cause the vehicle fail to run straight and even sway to left and right when cruising at medium and high speeds. Slight vehicle deviation symptoms will lead to abnormal tire wear and tire scrapping, and serious vehicle deviation symptoms will lead to tire blow-out, vehicle out of control and other dangerous situations.

The fourth pain point is related to chassis posture: the inconsistencies in the left and right wheelbases cause the tires do serpentine motion, exacerbate the abnormal wear of all ball joints or rubber sleeves of the control arm, result in loose and unstable feeling of the chassis, abnormal noise, and a sharp drop of handling experience.

The fifth pain point is related to direction control: the steering wheel swing, the uncomfortable and numb handling feeling, and the pulling sensation when passing the speed bump, fierce refueling, and slamming on the brakes.

The sixth pain point is related to the maintenance cost: the core chassis components/accessories that need to be replaced after abnormal wear or attenuation, the entire axle that needs to be replaced after the deformation of the inner-C-forgings and the axle housing caused by medium and high-strength off-roading, and the hydraulic steering system that is added to alleviate the extremely poor handling experience and so on, all of these brings a subsequent high maintenance cost of the vehicle.

The fundamental reason why the above problems can not be solved is because of the common structural design of all the integral front axle assemblies in the current market: the caster angles and the pinion to driveshaft angle on both sides can not be independently adjusted, thus, consumers can only bear various vehicle handling problems and major potential safety hazards caused by this design. What global automakers and modification shops can do is to spend a lot of labor and time to continuously fine-tune the vehicles with underwhelming result, which leads to low customer satisfaction.

Theoretically speaking, the installation position of the inner-C-forging on the axle tube can be changed by the split design of the inner-C-forging and the axle tube, and the caster angle and the pinion to driveshaft angle can be changed as well. However, how to design the connection structure between the inner-C-forging and the axle tube, so as to achieve a reliable and ease to use performance has become an urgent problem to be solved in the industry.

EMBODIMENTS

In one example aspect, the present document provides a split-type hard front axle and a vehicle having the same. The split-type hard front axle can conveniently adjust the caster angle and the pinion to driveshaft angle of the vehicle independently while ensuring the supporting strength.

As shown in FIGS. 1 to 4, a split-type hard front axle includes an axle housing 10, two axle tubes 20, two inner-C-forgings 30, and at least one connection structure. The axle tubes 20 are disposed at two opposite sides of the axle housing 10 respectively. The inner-C-forgoing 30 is located at an end of the axle tube 20 which is away from the axle housing 10 and is used to connect a kingpin knuckle (not shown). At least one inner-C-forgoing 30 is detachably fixed to a corresponding axle tube 20 by a corresponding connection structure. An outer wall of the axle tube 20 is provided with a first angle adjustment structure 21. The inner-C-forging 30 is provided with a connecting ring 31, and a second angle adjustment structure 32 is formed on an inner wall of the connecting ring 31. One of the first angle adjustment structure 21 and the second angle adjustment structure 32 is provided with a plurality of protrusions, and the other one of the first angle adjustment structure 21 and the second angle adjustment structure 32 is provided with a plurality of depressions. The plurality of protrusions and the plurality of depressions are respectively arranged at intervals along a circumferential direction of the axle tube 20 or along a circumferential direction of the connecting ring 31. The inner-C-forgoing 30 is sleeved on the outer wall of the axle tube 20 through the connecting ring 31, such that the protrusions extend into the depressions. A slot 311 is formed on the connecting ring 31 and extends along an axial direction thereof, the connection structure exerts a force to narrow the slot 311, such that the connecting ring 31 is detachably fixed on the axle tube 20. By means of the combinations of the protrusions with different depressions, the inner-C-forgoing 30 has different installation angles on the axle tube 20. In different installation angles, an included angle α (shown in FIG. 8, i.e., the caster to pinion angle) between an axis of a kingpin installation point and an axis of a driveshaft installation point is different.

In this embodiment, by means of separately arranging at least one inner-C-forging 30 from a corresponding axle tube 20, and detachably disposing the inner-C-forging 30 around the outer wall of the axle tube 20, when it is required to adjust the caster angle, the components on one side of the vehicle can be disassembled, and then the connection structure can be loosened, and the inner-C-forging 30 can be rotated around its own axis to a suitable angle, so that the protrusions can engage with the corresponding depressions, this can change the installation angle of the inner-C-forging 30 on the axle tube 20, and the angle of the installation point can be changed accordingly, and then the caster angle can be adjusted. After the adjustment is completed, the slot 311 on the connecting ring 31 is relocked by the connection structure, and the inner-C-forging 30 is fixed on the connecting ring 31.

Because the inner-C-forging 30 can be rotated around its own axis toward a front side of the vehicle, or toward a rear side of the vehicle, no matter the caster angle on which side of the vehicle needs to be adjusted, it can be realized by adjusting the installation angle of the corresponding inner-C-forging 30. Furthermore, since the inner-C-forgings 30 are separately arranged from the axle tube 20, the integrity of the axle tube 20 is ensured, and all of the installation points of the components on the axle tube 20, such as the support point of the shock absorber, and the connection point of the pull rod, and etc., can be arranged on the integral axle tube 20, which can improve the strength of the front axle. Therefore, on the premise of ensuring the support strength, the split-type hard front axle can easily adjust the caster angle and the caster to kingpin angle of the vehicle independently. Meanwhile, the positions and angles of the component installation points are still kept as original, and variables affecting the chassis wheelbase, the directional accuracy, and the suspension height cannot be introduced.

Furthermore, in this embodiment, the two axle tubes 20 are both connected to the corresponding inner-C-forgings 30 by the connection structures at their respective ends.

Figure 5:
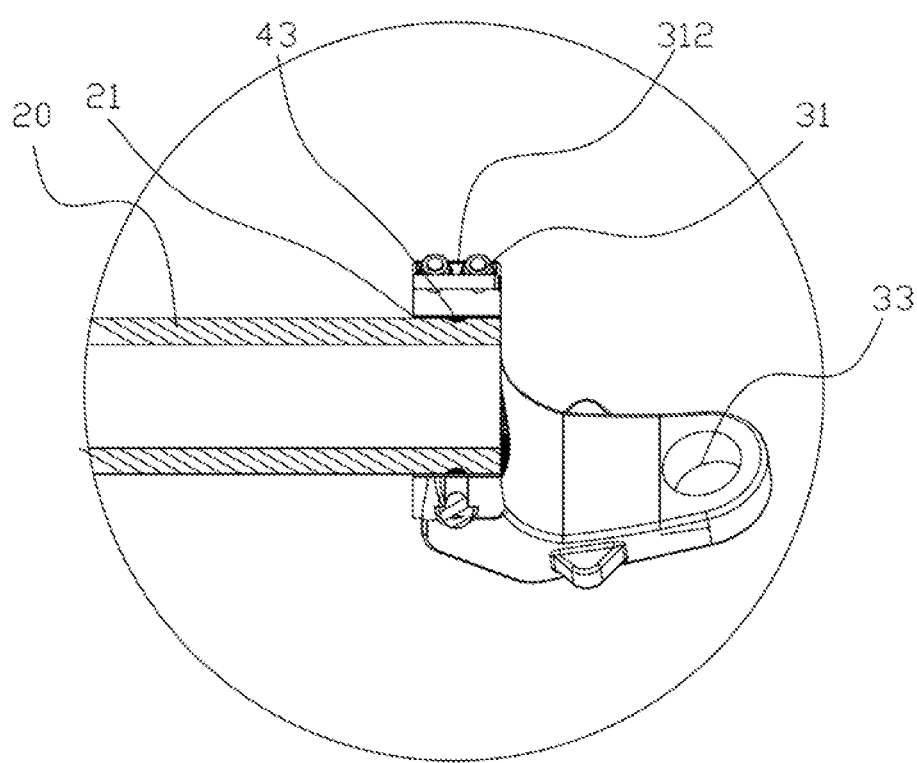
FIG. 5 is a schematic, enlarged view of circle A in FIG. 4.
Figure 6:
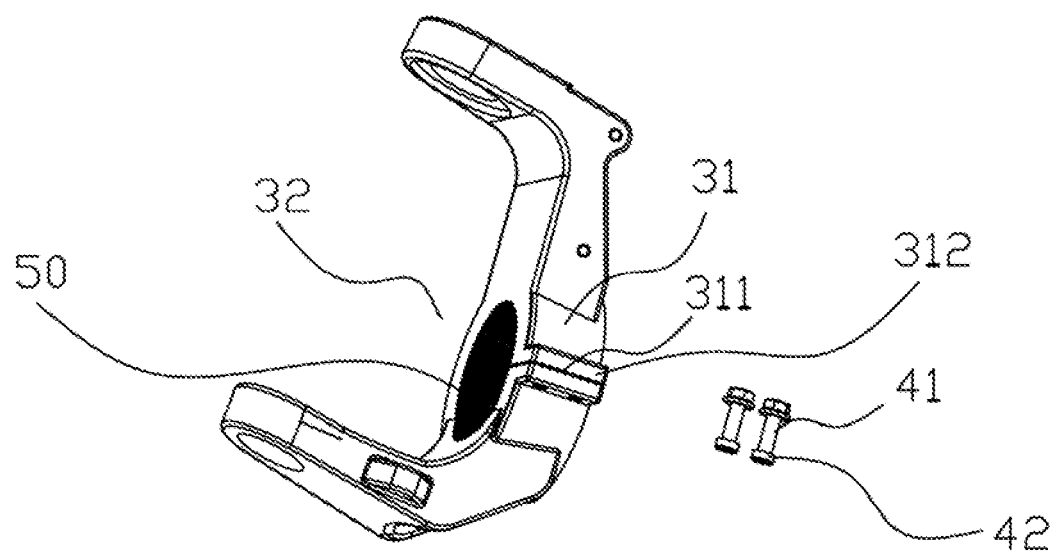
FIG. 6 is a schematic view of an example of an inner-C-forging and the first bolt.

As shown in FIG. 5 and FIG. 6, the first angle adjustment structure 21 and the second angle adjustment structure 32 each is provided with a plurality of gear teeth 50 arranged at intervals along its circumferential direction, that is, in this embodiment, the protrusions are the gear teeth 50, and the depressions are formed between adjacent gear teeth 50. By means of the engagement of the gear teeth 50 on one adjustment structure and the depressions on the other adjustment structure, the circumferential positions of the inner-C-forging 30 on the axle tube 20 are determined.

Figure 2:
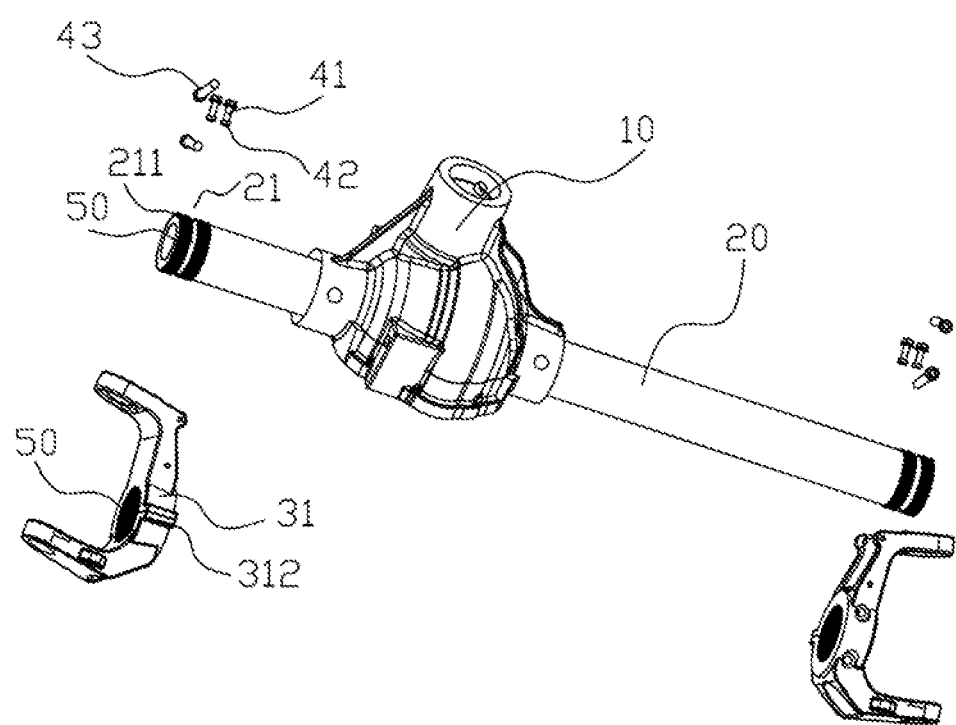
FIG. 2 is a schematic, exploded view of the split-type hard front axle in FIG. 1.
Figure 3:
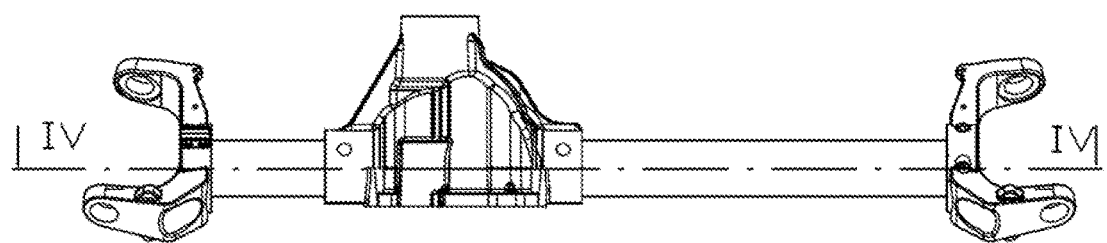
FIG. 3 is a schematic, front view of the split-type hard front axle in FIG. 1.
Figure 4:
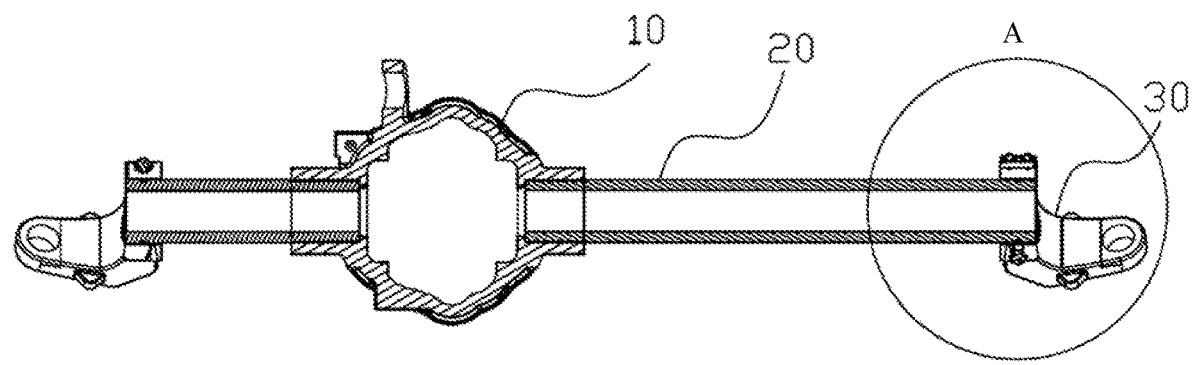
FIG. 4 is a schematic, cross-sectional view taken along line IV-IV of FIG. 3.

As shown in FIG. 2 and FIG. 6, the connecting ring 31 is provided with two connecting ears 312 on both sides of the slot 311, and the connecting ears 312 radially extending outwardly from the outer wall of the connecting ring 31. The connection structure includes a first bolt 41 and a first nut 42. The first bolt 41 passes through the two connecting ears 312 and connects with the first nut 42. By means of fastening the first nut 42 on the first bolt 41, the width of the slot 311 can be reduced, making the connecting ring 31 be contracted and the diameter of the connecting ring 31 be reduced, thereby fixing the connecting ring 31 on the first angle adjustment structure 21 to prevent the inner-C-forging 30 from rotating along the circumferential direction of the axle tube 20.

Figure 7:
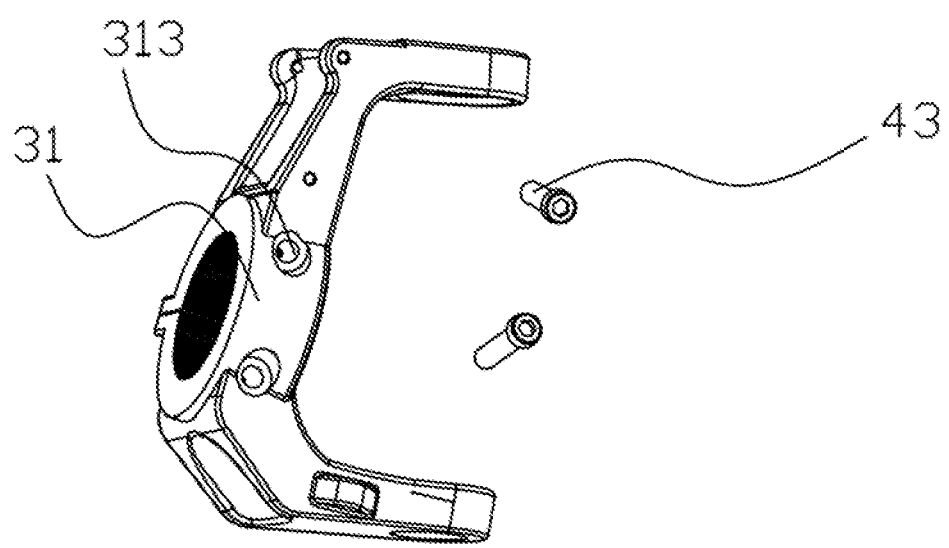
FIG. 7 is a schematic view of an example of an inner-C-forging and the second bolt.
Figure 8:
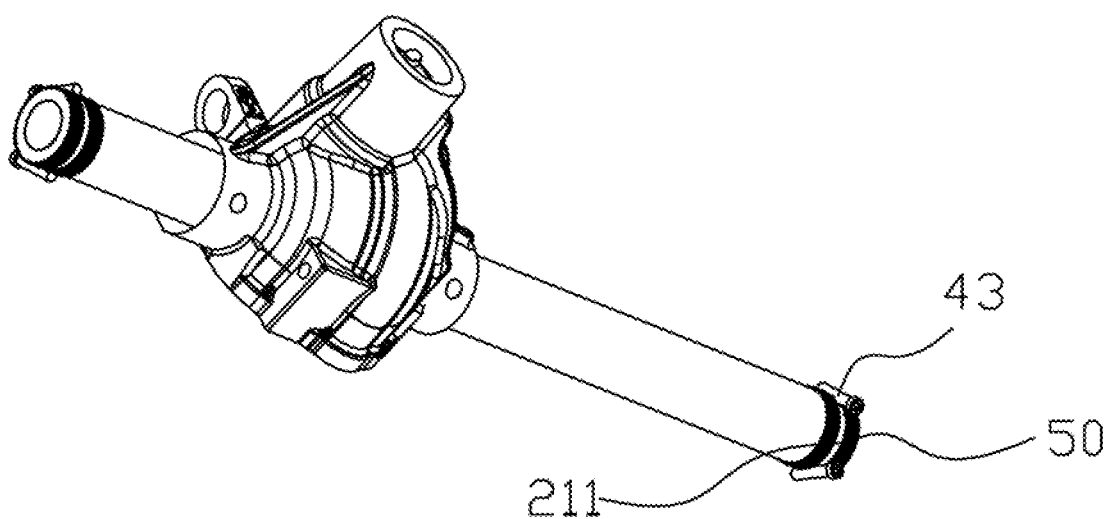
FIG. 8 is a schematic view showing an example of a cooperation relationship between the second bolt and the axle tube.

As shown in FIG. 5, FIG. 7 and FIG. 8, a diameter of the first angle adjustment structure 21 is greater than a diameter of the axle tube 20, that is, the first angle adjustment structure 21 is formed on an annular projection radially extending outwardly from the axle tube 20. By means of the settings of the above structure, the strength of the axle tube 20 is strengthened at a position where the first angle adjustment structure 21 locates.

Referring to FIG. 5 and FIG. 7, in this embodiment, an indentation is formed on the first angle adjustment structure 21 along the circumferential direction of the axle tube 20, the indentation is recessed inwardly from the outer wall of the axle tube 20, so that a groove 211 is formed on the first angle adjustment structure 21. A side wall of the connecting ring 31 is provided with a through hole 313, and the connection structure further includes a second bolt 43. The second bolt 43 passes through the through hole 313 of the connecting ring 31 and extends into the groove 211 of the first angle adjustment structure 21. Since the second bolt 43 extends into the groove 211, the side walls on axial sides of the groove 211 could limit the position of the second bolt 43, which can prevent the inner-C-forging 30 from moving along the axial direction of the axle tube 20. In this embodiment, both of the axial sides of the groove 211 are formed with protrusions or depressions, that is to say, both sides of the groove 211 are formed with gear teeth 50, so as to ensure a balance of a force at both sides of the groove 211.

When the second bolt 43 extends into the groove 211, an extension direction of an axis of the second bolt 43 is tangent to the outer circumference of the axle tube 20 at the position of the groove 211. Therefore, when preventing the inner-C-forging 30 from moving along the axis of the axle tube 20, the second bolt 43 is subjected to a force perpendicular to its axis, which can prevent the deformation of the second bolt 43 and also can prevent the second bolt 43 from damaging the outer wall of the axle tube 20.

Referring to FIG. 1 and FIG. 2, FIG. 5, in the present embodiment, two opposite connecting holes 33 are respectively formed on the inner-C-forgings 30, and the connecting holes 33 are respectively arranged at opposite sides of the axis of the axle tube 20, and the kingpin may be inserted in the two connecting holes 33. Under such arrangement, an axis of the kingpin, or an axis of the installation point of the kingpin can be regarded as coincide with a line connecting centers of the two connecting holes 33.

Figure 9:
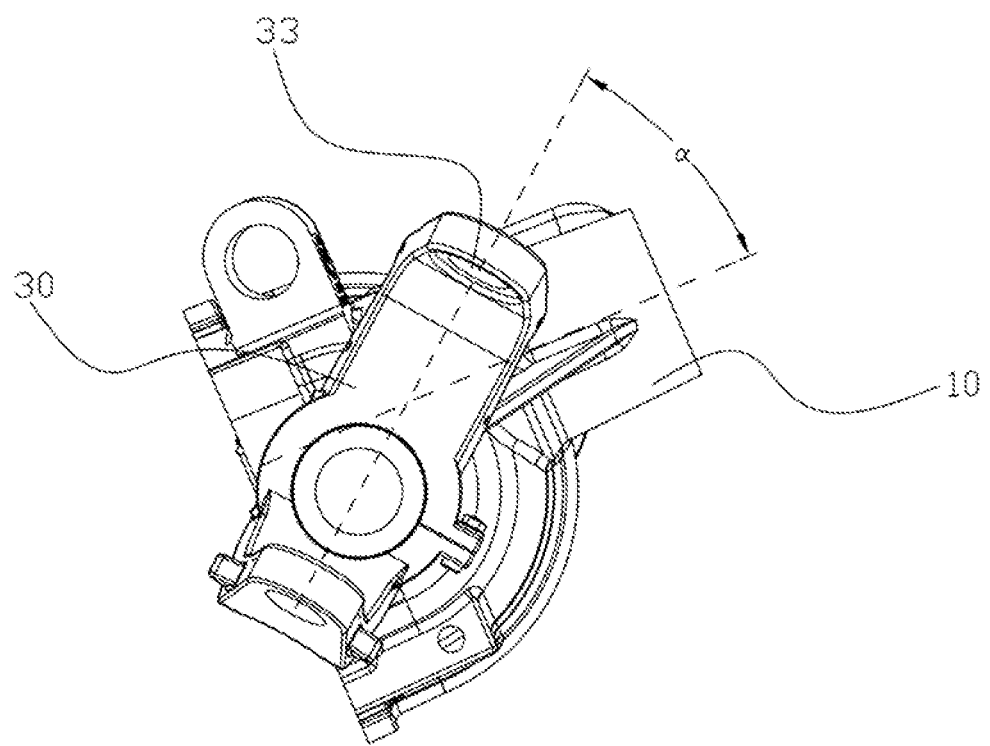
FIG. 9 is a schematic view showing an example of a pinion to driveshaft angle.

Referring to FIG. 9, the included angle (see a in FIG. 9) formed between the axis of the kingpin installation point and the axis of the driveshaft installation point is shown, that is, the angle between the inner-C-forging 30 and the driveshaft is shown in this Figure. Through the above arrangement, the included angle can be adjusted within a certain range without disassembly of peripheral components. Furthermore, the above arrangement can also meet the requirements of various types of vehicles when adjusting the caster angle.

In summary, in some embodiments, the inner-C-forging 30 on at least one of the axle tubes 20 is separately arranged from the corresponding axle tube 20, and the inner-C-forging 30 is detachably sleeved on the outer wall of the axle tube 20. When it is necessary to adjust the caster angle, the components on one side of the vehicle can be disassembled, and then the connection structure is loosened, and the inner-C-forging 30 is rotated around its own axis to a suitable angle, so that the protrusions engage with the corresponding depressions. This can change the installation angle of the inner-C-forging 30 relative to the axle tube 20, and change the angle of the installation point, and further can adjust the caster angle. After the adjustment is completed, the slot 311 on the connecting ring 31 is relocked through the connection structure, so that the inner-C-forging 30 is fixed on the connecting ring 31. Through the above method, the installation angle of the inner-C-forging 30 relative to the axle tube 20 can be changed, and the angle of the installation point can be changed, and the caster angle can be adjusted as well. Therefore, under the premise of ensuring the support strength, the split-type hard front axle can easily adjust the caster angle and the caster to kingpin angle on both sides of the vehicle independently. Meanwhile, the positions and angles of the installation points of the components on the axle tube 20 are still kept as original, and variables that affect the chassis wheelbase, the directional accuracy, and the suspension height cannot be introduced.

Some embodiments may include a vehicle, which includes the above-mentioned split-type hard front axle. Other technical features of the vehicle are common knowledge in the field, and will not be repeated here.

The above descriptions are only preferred embodiments, and it should be pointed out that for those of ordinary skill in the art, without departing from the principle of the present document, some improvements and modifications can also be made, and these improvements and modifications are also considered to be included in the protection scope of the present document.

What is claimed is:
1. A front axle assembly, comprising:
   an axle housing;
   an axle tube connected to an end of the axle housing;
   an inner-C-forging located at an end of the axle tube away from the axle housing and configured for connecting with a kingpin knuckle; and
   a connection structure configured for detachably fixing the inner-C-forging on the axle tube;
   the axle tube being provided with a first angle adjustment structure formed on an outer wall thereof, the inner-C-forging being provided with a connection ring, the connection ring being provided with a second angle adjustment structure and a slot, the inner-C-forging being sleeved on the outer wall of the axle tube through the connection ring, with the first angle adjustment structure cooperating with the second angle adjustment structure, the slot being capable of being compressed under a force of the connection structure, to fix the inner-C-forging on the axle tube, the first angle adjustment structure and the second angle adjustment structure having different cooperation positions so that the inner-C-forging having different installation angles on the axle tube, and a caster to pinion angle being different at each of the different installation angles of the inner-C-forging.

2. The front axle assembly according to claim 1, wherein the front axle assembly comprises two axle tubes and two inner-C-forgings, the two inner-C-forgings are detachably arranged on the two axle tubes through the connection structures respectively.

3. The front axle assembly according to claim 1, wherein one of the first angle adjustment structure and the second angle adjustment structure is provided with a plurality of protrusions, the other one of the first angle adjustment structure and the second angle adjustment structure is provided with a plurality of depressions, the protrusions or the depressions are disposed along a circumferential direction of a corresponding axle tube or a circumferential direction of the connecting ring, the second angle adjustment structure has different cooperation positions on the first angle adjustment structure by means of the cooperation of different protrusions and different depressions.

4. The front axle assembly according to claim 3, wherein both of the first angle adjustment structure and the second angle adjustment structure are provided with a plurality of gear teeth arranged at intervals along respective circumferential directions, the protrusions are the gear teeth, and the depressions are formed between adjacent gear teeth.

5. The front axle assembly according to claim 1, wherein the connecting ring is provided with two connecting ears on both sides of the slot, and the connection structure comprises a first bolt and a first nut, the first bolt passes through the two connecting ears and connects with the first nut.

6. The front axle assembly according to claim 1, wherein a diameter of the first angle adjustment structure is greater than a diameter of the axle tube.

7. The front axle assembly according to claim 3, wherein the first angle adjustment structure is provided with a groove, the groove is recessed inwardly from an outer wall of the axle tube and extends along a circumferential direction of the axle tube, and a side wall of the connecting ring is provided with a through hole, the connection structure further comprises a second bolt, and the second bolt passes through the through hole on the connecting ring and extends into the groove.

8. The front axle assembly according to claim 7, wherein both axial sides of the groove are provided with the protrusions or the depressions.

9. The front axle assembly according to claim 7, wherein when the second bolt extends into the groove, an extension direction of an axis of the second bolt is tangent to an outer circumference of the axle tube.

10. The front axle assembly according to claim 2, wherein the inner-C-forgings are provided with two opposite connecting holes for fixing the kingpin knuckle, the two connecting holes are respectively arranged at opposite sides of an axis of the axle tube.

11. A front axle assembly, comprising:
an axle housing;
an axle tube connected to an end of the axle housing;
an inner-C-forging located at an end of the axle tube away from the axle housing and configured for connecting with a kingpin knuckle; and
a connection structure cooperated with the inner-C-forgoing, configured for detachably fixing the inner-C-forging on the axle tube;
the axle tube being provided with a first angle adjustment structure, the inner-C-forging being provided with a second angle adjustment structure, the inner-C-forging being sleeved on the outer wall of the axle tube, and a portion of the inner-C-forging being capable of deforming under a force exerted by the connection structure, to fix the inner-C-forging on the axle tube, the first angle adjustment structure being capable of cooperating with different portions of the second angle adjustment structure to make the inner-C-forging have different installation angles on the axle tube, and a caster to pinion angle being different at each of the different installation angles of the inner-C-forging.

12. The front axle assembly according to claim 11, wherein one of the first angle adjustment structure and the second angle adjustment structure comprises a plurality of protrusions, the other one of the first angle adjustment structure and the second angle adjustment structure comprises a plurality of depressions, the second angle adjustment structure cooperates with different positions of the first angle adjustment structure by a cooperation of different protrusions and different depressions.

13. The front axle assembly according to claim 12, wherein both of the first angle adjustment structure and the second angle adjustment structure comprise a plurality of gear teeth arranged along respective circumferential directions, the protrusions are the gear teeth, and the depressions are formed between adjacent gear teeth.

14. The front axle assembly according to claim 11, wherein the inner-C-forging is provided with a connection ring, the connection ring is provided with a slot extending along an axial direction thereof, the inner-C-forging is capable of contracting due to the slot.

15. The front axle assembly according to claim 14, wherein the connecting ring is provided with two connecting ears forming opposite sides of the slot, the connection structure comprises a first bolt and a first nut, the first bolt passes through the two connecting ears and connects with the first nut to exert a contraction force on the inner-C-forging.

16. The front axle assembly according to claim 14, wherein the first angle adjustment structure is provided with a groove, the groove is recessed inwardly from an outer wall of the axle tube and extends along a circumferential direction of the axle tube, a side wall of the connecting ring is provided with a through hole, the connection structure further comprises a second bolt, and the second bolt passes through the through hole on the connecting ring and extends into the groove.

17. A vehicle, comprising the front axle assembly according to claim 11.

18. The vehicle according to claim 17, wherein one of the first angle adjustment structure and the second angle adjustment structure comprises a plurality of protrusions, the other one of the first angle adjustment structure and the second angle adjustment structure comprises a plurality of depressions, the second angle adjustment structure cooperates with different positions of the first angle adjustment structure by a cooperation of different protrusions and different depressions.

19. The vehicle according to claim 17, wherein the inner-C-forging is provided with a connection ring, the connection ring is provided with a slot extending along an axial direction thereof, the inner-C-forging is capable of contracting due to the slot.

20. The vehicle according to claim 19, wherein the first angle adjustment structure is provided with a groove, the groove is recessed inwardly from an outer wall of the axle tube and extends along a circumferential direction of the axle tube, a side wall of the connecting ring is provided with a through hole, the connection structure further comprises a second bolt, and the second bolt passes through the through hole on the connecting ring and extends into the groove.

\* \* \* \* \*